United States Patent [19]

Fukunaga et al.

[11] Patent Number: 4,641,354
[45] Date of Patent: Feb. 3, 1987

[54] APPARATUS FOR RECOGNIZING AND DISPLAYING HANDWRITTEN CHARACTERS AND FIGURES

[75] Inventors: Yasushi Fukunaga, Hitachi; Soshiro Kuzunuki, Katsuta; Hiroshi Shojima, Hitachi; Takanori Yokoyama, Hitachi; Kazuyoshi Koga, Hitachi; Kotaro Hirasawa, Hitachi; Shinichi Kawada, Hitachiota, all of Japan

[73] Assignee: Hitachi, Ltd., Tokyo, Japan

[21] Appl. No.: 716,944

[22] Filed: Mar. 28, 1985

[30] Foreign Application Priority Data

Mar. 30, 1984 [JP] Japan ................... 59-60717

[51] Int. Cl.[4] .............................. G06K 9/00
[52] U.S. Cl. ........................ 382/13; 382/24; 178/18
[58] Field of Search ............ 382/13, 18, 19, 24; 178/18, 19

[56] References Cited

U.S. PATENT DOCUMENTS 3,487,371 12/1969 Frank ................... 382/13
3,761,877 9/1973 Fernald ................ 382/13

FOREIGN PATENT DOCUMENTS 105084 12/1980 Japan.

Primary Examiner—David K. Moore
Assistant Examiner—Jacqueline Todd
Attorney, Agent, or Firm—Antonelli, Terry & Wands

[57] ABSTRACT

An apparatus for recognizing and displaying handwritten characters and figures in which input stroke information on a handwritten input character or figure is read out by an electromagnetic tablet, recognition means performs character/figure recognition on the basis of the feature of the input stroke information, display means displays the input stroke information and the result of recognition, and when the result of recognition is displayed on a display screen of the display means, stroke information having been used for recognition is erased from the display screen, and stroke information which is not yet used for recognition, is left on the display screen.

12 Claims, 7 Drawing Figures

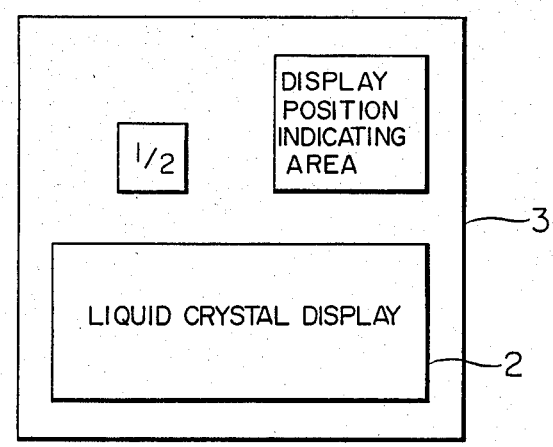

APPARATUS FOR RECOGNIZING AND DISPLAYING HANDWRITTEN CHARACTERS AND FIGURES

CROSS-REFERENCES OF THE RELATED APPLICATIONS

This application relates to U.S. application Ser. No. 716,943 entitled "METHOD FOR DESIGNATING A RECOGNIZATION MODE IN A HAND-WRITTEN CHARACTER/GRAPHIC RECOGNIZER" by Fukunaga et al. and assigned to the present assignee, based on Japanese Patent Application No. 59-58298 filed Mar. 28, 1984, whose disclosure is incorporated herein by reference.

BACKGROUND OF THE INVENTION

The present invention relates to an apparatus for recognizing and displaying handwritten characters and figures, and more particularly to the display of stroke information inputted by handwriting and the display of the result of character/figure recognition.

A recognition/display apparatus in which a tablet plate and a display device overlap each other and are united in one body, to display the result of recognition in a printing type form at a place beneath a handwritten character or figure, is disclosed in Japanese patent laid-open specification No. 144,287/83.

In this apparatus, the tablet plate is divided into a plurality of rectangular areas, input strokes are displayed on the display device, and recognition processing is carried out for each rectangular area. Further, when the recognition processing for a rectangular area is completed, the result of recognition is displayed in place of the input strokes in the rectangular area. That is, the strokes in a rectangular area are displayed before recognition, and automatically erased when the recognition processing for the rectangular area is completed.

However, in the case where handwritten characters and figures coexist in a rectangular area, if the subject of the display is changed from all strokes included in the rectangular area to the result of character/figure recognition, there will arise the following problems.

(1) Let us consider the case where characters are handwritten on a line which is part of a figure. In order to erase the strokes of handwritten characters included in a rectangular area, it is required to display the result of recognition processing for the rectangular area, and thus the line in the rectangular area is not displayed. That is, the line in the rectangular area is erased.

(2) When a figure is inputted in the form of strokes and the apparatus is so operated as to display the result of figure recognition, the above strokes displayed on the display device cannot be erased. In more detail, in contrast to character recognition, in figure recognition, each rectangular area is not used as a recognition unit. That is, in order to display only the result of figure recognition, characters which are displayed as a result of recognition, may be erased, and thus it is impossible to erase only strokes which have been used for figure recognition. For this reason, in some cases, the result of figure recognition is displayed while retaining input strokes indicative of a handwritten figure in the display. On the other hand, when all displayed strokes are erased to display the result of figure recognition, even strokes which are not yet used for recognition, are erased. Such an operation is highly objectionable.

SUMMARY OF THE INVENTION

It is accordingly an object of the present invention to provide an apparatus for recognizing and displaying handwritten characters and figures, in which when the result of recognition is displayed, only stroke information having been used for recognition is erased from a display screen and stroke information which is not yet used for recognition, is left on the display screen.

In order to attain the above object, according to one aspect of the present invention, stroke information inputted by handwriting is first displayed, and then erased piece by piece each time the result of recognition is displayed.

Further, according to another aspect of the present invention, recognition processing is carried out each time a stroke is inputted, and when recognition processing is completed, a stroke having been used for the recognition processing is erased from a display screen, while leaving a stroke which is not subjected to recognition processing, on the display screen.

According to a further aspect of the present invention, when the result of recognition processing is sent from the recognition means to a display device, the number of strokes or the number of position coordinates is delivered, as stroke information concerned with recognition, from the recognition means, and only strokes having been used for recognition are erased from the display screen of the display device on the basis of the above stroke information.

BRIEF DESCRIPTION OF THE DRAWINGS

FIG. 3 is a plan view showing a united body which includes input means and a display device.

FIG. 4 shows respective formats of three examples of transferred data.

DESCRIPTION OF THE PREFERRED EMBODIMENTS

Figure 1:
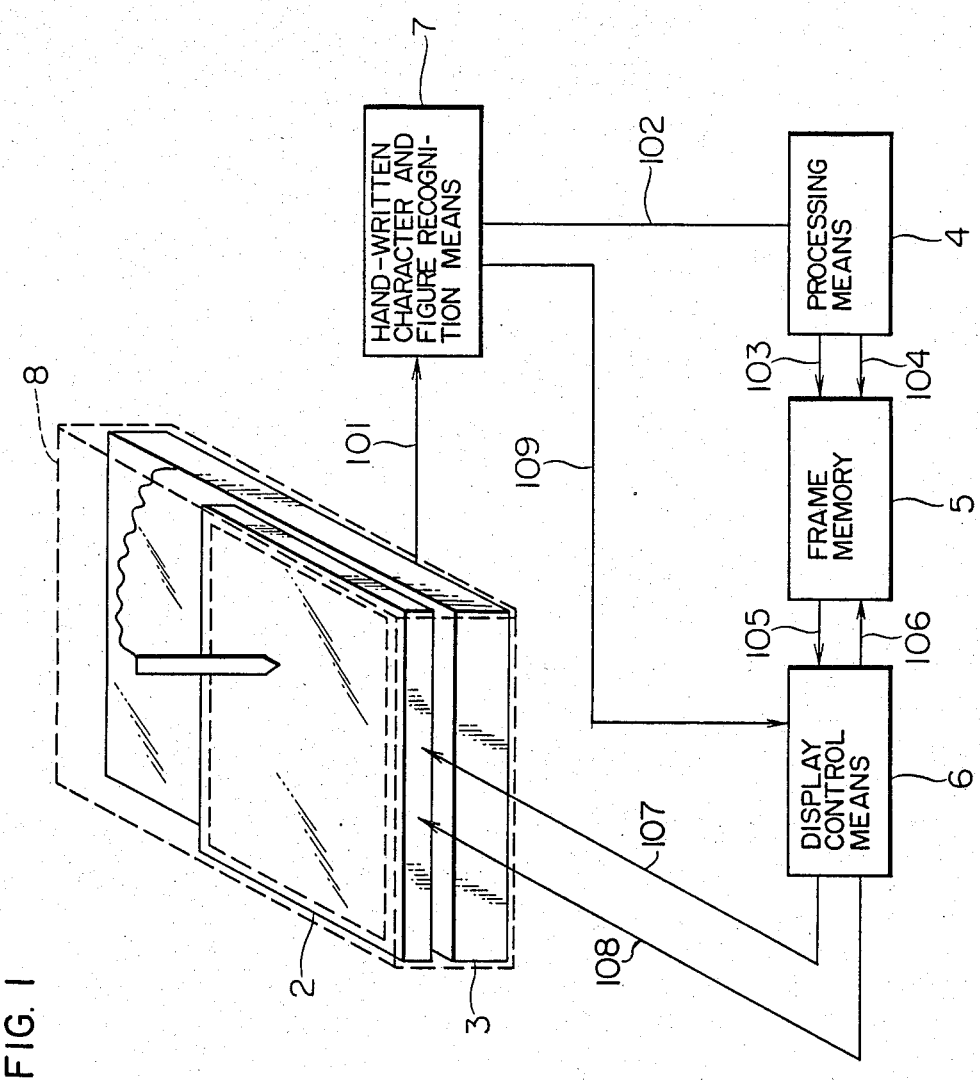
FIG. 1 is a diagram showing the whole construction of an embodiment of an apparatus for recognizing and displaying handwritten characters and figures according to the present invention.

FIG. 1 shows an embodiment of an apparatus for recognizing and displaying handwritten characters and figures according to the present invention. In FIG. 1, reference numeral 1 designates a stylus pen of electromagnetic induction type, 2 denotes a liquid crystal display, 3 denotes an electromagnetic tablet, 4 denotes processing means, 5 denotes a frame memory, 6 denotes display control means, 7 denotes handwritten character and figure recognition means, and 8 denotes a cover. As a whole, the above parts and means 1 to 8 make up an input integrated flat panel display.

Figure 2:
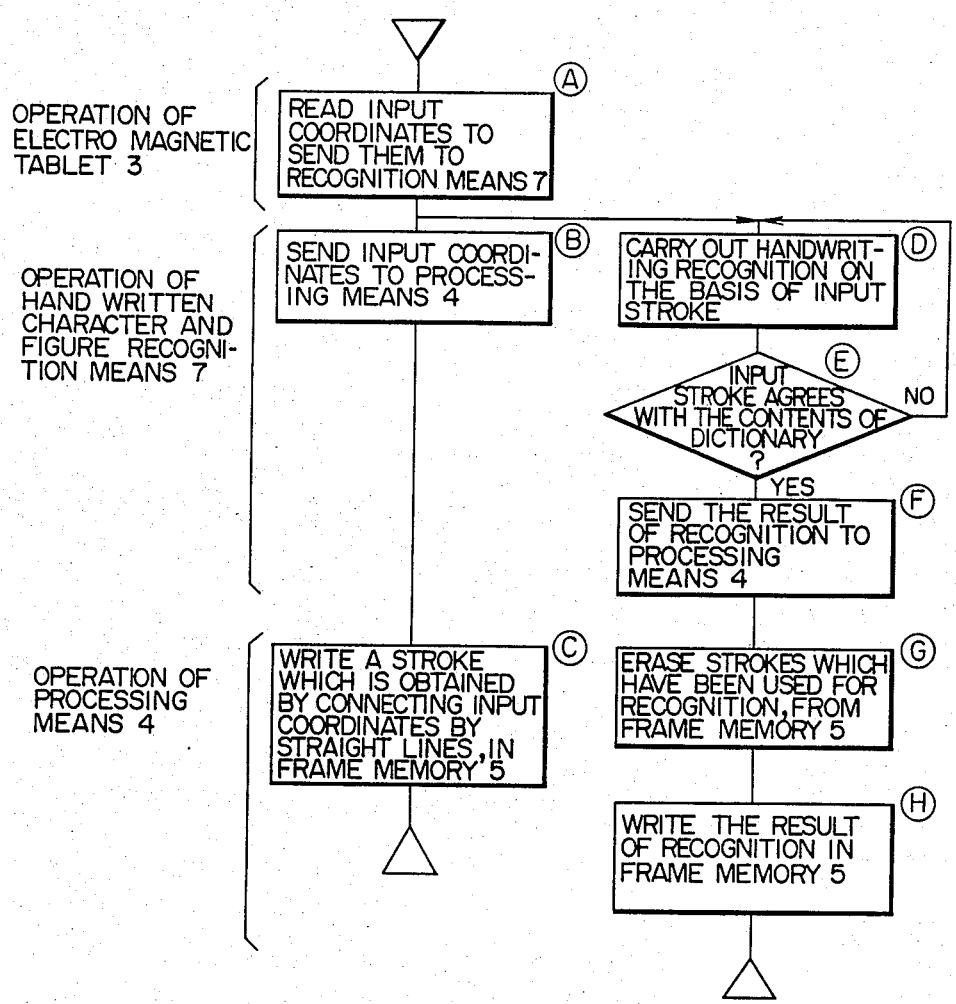
FIG. 2 is a flow chart for explaining the operation of the embodiment of FIG. 1.

Further, FIG. 2 is a flow chart for explaining the operation of the embodiment of FIG. 1. As shown in FIG. 2, the operation of the tablet 3 is shown in step Ⓐ, the operation of the handwritten character and figure recognition means 7 is shown in Steps Ⓑ, Ⓓ, Ⓔ and Ⓕ, and the operation of the processing means 4 is shown in steps Ⓒ, Ⓖ and Ⓗ.

When a stroke is drawn on the liquid crystal display 2 with the stylus pen 1 which emits an electromagnetic wave, the electromagnetic wave passes through the liquid crystal display 2 to reach the electromagnetic tablet 3, and the coordinates of input points can be read by the tablet 3. The coordinates of the input points are successively sent to the handwritten character and pattern recognition means (hereinafter simply referred to as "recognition means") 7 through a bus 101 (step Ⓐ). The recognition means 7 sends the above coordinates to the processing means 4 through a bus 102 after having subjected the coordinates to coordinate transformation, to prepare for displaying the stroke (step Ⓑ). The processing means 4 writes a straight line connecting adjacent ones of the above coordinates in the frame memory 5 at corresponding positions thereof, to prepare for displaying the stroke on the liquid crystal display 2 (step Ⓒ). At the same time, the recognition means 7 performs handwriting recognition on the basis of the input stroke (step Ⓓ). It is judged whether or not the input stroke agrees with a character or a figure stored in a dictionary (not shown) at (step Ⓔ). When the input stroke does not agree with such a character or figure, the recognition means 7 waits for the next stroke. When the input stroke agrees with such a character or figure, the character or figure, that is, the result of recognition, is sent to the processing means 4 through the bus 102 (step Ⓕ). At this time, not only the character code or figure thus determined, but also information on how many input strokes have been used for recognition, is sent to the processing means 4, as will be mentioned later. On receiving the result of recognition, the processing means 4 issues a command for erasing strokes which have been used for recognition, from the memory 5 on the basis of the above information. The command is sent to the frame memory 5 through a bus 103 (step Ⓖ). Further, the processing means 4 writes the result of recognition in the frame memory 5 through a bus 104 (step Ⓗ).

The contents of the frame memory 5 are always read out by the display control means 6 at a frequency of more than 60 Hz, to be sent to the liquid crystal display 2 through buses 107 and 108. Accordingly, every change in the frame memory 5 can be instantaneously displayed on the liquid crystal display 2.

In the above, an outline of the operation of the present embodiment has been explained. The operation of each part or means will be explained below in more detail.

(1) Operation for reading input coordinates

On receiving the electromagnetic wave from the stylus pen 1, the electromagnetic tablet 3 detects coordinates indicated by the tip of the pen 1. At this time, information as to whether or not the pen 1 is pressed against the liquid crystal display 2 or cover 8, can be read together with the coordinate information indicated by the tip of the pen 1. Thus, an absolute position coordinate on the tablet 3 and information on whether the pen 1 is placed in a pen down status or placed in a pen up status, are supplied to the recognition means 7.

(2) Operation of recognition means 7

FIG. 3 shows the positional relationship among the electromagnetic tablet 3, the display part of the liquid crystal display 2, an area for indicating what portion of the frame memory 5 is to be displayed, and another area, viewed from the upside of the display part. The tablet 3 can input all position coordinates for the whole of FIG. 3, to the recognition means 7. The recognition means 7 separates position coordinates which are given through the bus 101, into position coordinates included in the display part of the liquid crystal display 2, those included in the display position indicating area, those included in a ½ indicating area, and other position coordinates, on the basis of the positional relationship shown in FIG. 3. The display position indicating area and ½ indicating area are provided to solve the problem that the display part of the liquid crystal display 2 is small and therefore cannot display the whole of the frame memory 5. For instance, the frame memory 5 has 1280×1024 dots, and only a portion including 640×256 dots can be displayed on the liquid crystal display 2. A portion to be displayed can be specified by indicating the portion at the display position indicating area. Further, the reduction of a portion including 1280×512 dots on a scale of 1:2 can be specified by pressing the pen 1 against the ½ indicating area. Such information is sent to the display control means 6 through a bus 109, and thus the read address for the frame memory 5 is changed.

Now, explanation will be made of a case where the pen 1 is pressed against the display part of FIG. 3.

Input X- and Y-coordinates on the tablet 3 are converted into x- and y-coordinates in the frame memory 5 in accordance with the following equation for coordinate transformation:

$$\begin{pmatrix} x \\ y \end{pmatrix} = M \begin{pmatrix} a & 0 & b \\ 0 & c & d \end{pmatrix} \begin{pmatrix} X \\ Y \\ 1 \end{pmatrix} + \begin{pmatrix} X_0 \\ Y_0 \end{pmatrix} \quad (1)$$

where M is equal to 1 (for ordinary display) or 2 (for reduced display on a scale of ½), a, b, c and d are matrix elements for converting input coordinates on the tablet into coordinates on the display part of the liquid crystal display 2, and ($X_0$, $Y_0$) are reference coordinates for indicating that a portion which is included in the frame memory 5 and starts from the position having the coordinates $X_0$ and $Y_0$, is displayed on the liquid crystal display 2.

The x- and y-coordinates obtained by the coordinate transformation are sent to the processing means 4 through the bus 102, together with status information indicative of the pen up status or pen down status.

At this time, the recognition means 7 performs handwriting recognition on the basis of the X-, Y-coordinate information and the status information indicative of the pen up status or pen down status.

At first, input position coordinates included in a stroke are separated from those included in another stroke, on the basis of the pen status information. In more detail, when the state of the pen 1 is changed from the pen up status to the pen down status, a stroke is started, and input position coordinates are stacked in the recognition means 7. When the pen 1 kept at the pen down status is lifted, the stroke terminates. When one stroke is inputted in the above-mentioned manner, recognition is carried out on the basis of the stacked input position coordinates.

When the stacked input position coordinates do not agree with a character or figure stored in the dictionary, the recognition means 7 will wait for the next stroke. When the above input position coordinates agree with a character or figure, the result of recognition is sent to the processing means 4 through the bus 102.

FIG. 4 shows data formats used in sending the result of recognition to the processing means 4. Part (a) of FIG. 4 shows the format in the case where the previously-mentioned coordinate information is sent to the processing means 4. This format includes a flag FLAG A for indicating the sending of coordinate information, pen status information PEN indicative of the pen up status or pen down status, and x- and y-coordinates. Part (b) of FIG. 4 shows the format in the case where the result of character recognition is sent. The format of part (b) includes a flag FLAG B for indicating the sending of the result of character recognition, the number n of strokes which have been used for character recognition, the code CHAR of a recognized character, the size SIZE of the character, and a position LOCATION where the character was written. Part (c) of FIG. 4 shows the format in the case where the result of figure recognition is sent. The format of part (c) is different from that of part (b) in that a flag FLAG C for indicating the sending of the result of figure recognition is used in place of the FLAG B, and the code CODE of the recognized figure is used in place of the character code CHAR.

By using the above formats, the coordinate information and the result of character/figure recognition can be sent to the processing means 4. It is to be noted that a characteristic feature of the present embodiment resides in that the number n of strokes having been used for character/figure recognition is sent from the recognition means 7 to the processing means 4.

(3) Operation of processing means 4

Figure 5:
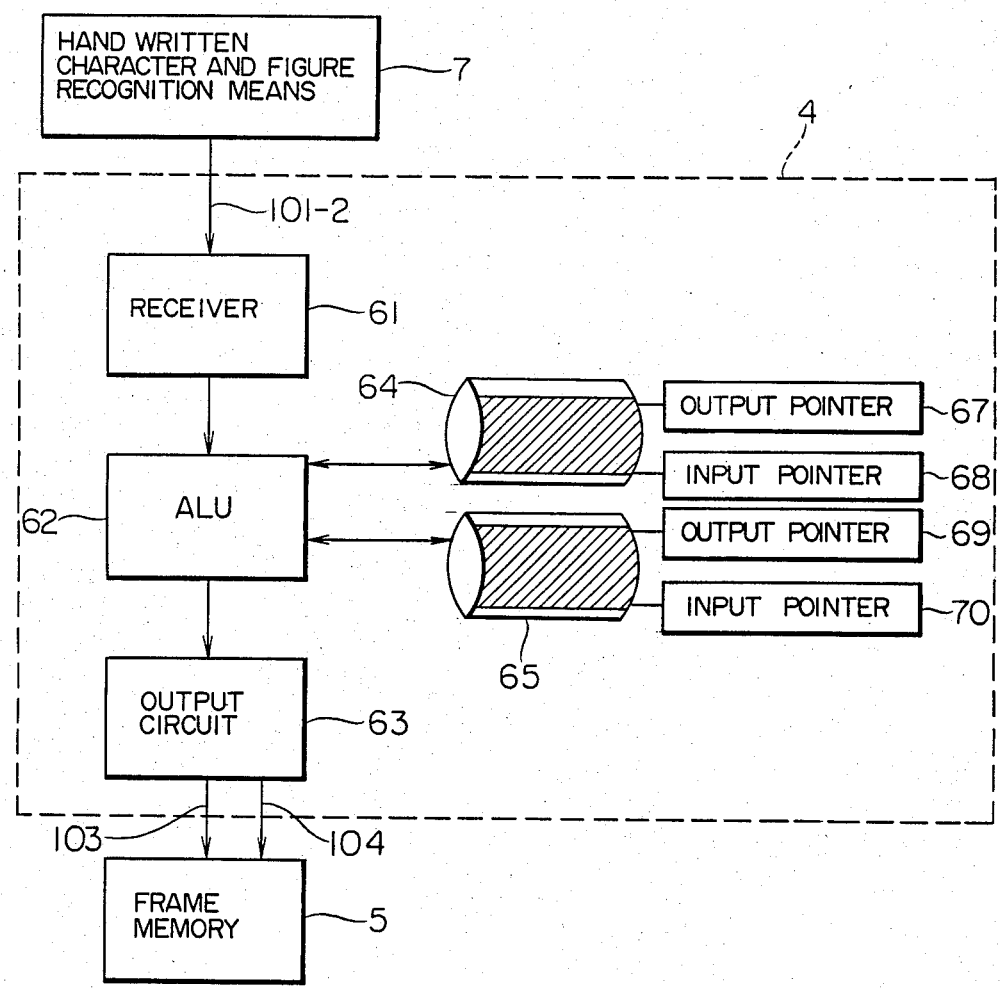
FIG. 5 is a diagram showing an example of the processing means of FIG. 1.

FIG. 5 shows the construction of the processing means 4. Referring to FIG. 5, the processing means 4 includes a receiver 61 serving as an interface to the recognition means 7, an arithmetic and logic unit (hereinafter referred to as "ALU") 62 with registers, first-in first-out memories (namely, FIFO memories) 64 and 65, respective input pointers 68 and 70 of the memories 64 and 65, respective output pointers 67 and 69 of the memories 64 and 65, and an output circuit 63 connected to the frame memory 5. An integer indicating the number of position coordinates (each made up of x- and y-coordinates) included in one stroke can be stored in and read out from the memory 64, and a pair of x- and y-coordinates can be stored in and read out from the memory 65.

The ALU 62 has a register for storing the number of position coordinates (for example, m and p), the "state" for indicating an operational state, and x- and y-coordinates such as ($\alpha$, $\beta$) and ($\gamma$, $\delta$), and another register for holding received data. The numerals m and p, the term "state", and the coordinates ($\alpha$, $\beta$) and ($\gamma$, $\delta$) will be explained later. The ALU 62 performs addition and subtraction, and controls the memories 64 and 65 and output circuit 63, using data stored in these registers.

Now, the operation of the ALU 62 will be explained below, with reference to a flow chart shown in FIGS. 6A and 6B.

Figure 6A:
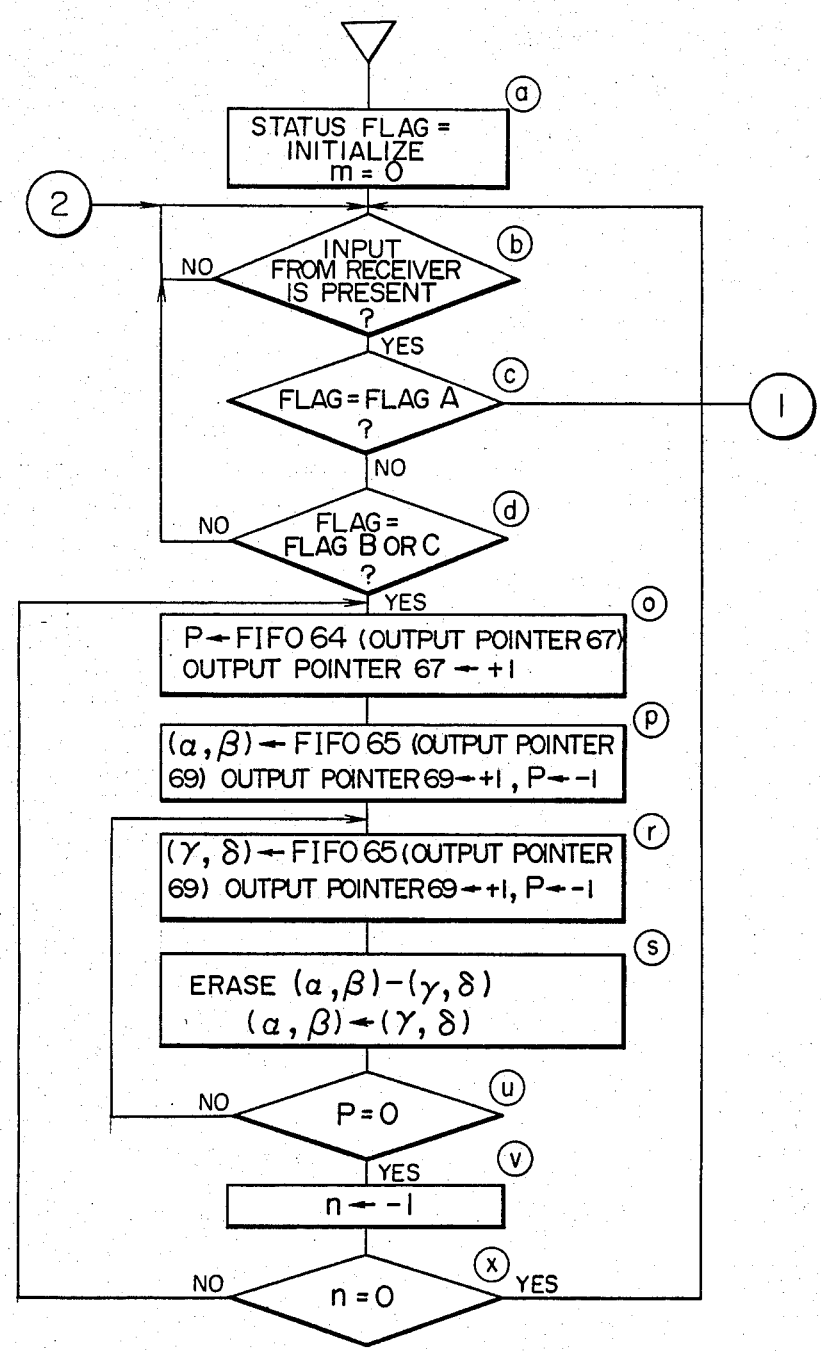
FIGS. 6A and 6B show a flow chart for explaining the operation of the ALU of FIG. 5.

After having been initialized in step ⓐ of FIG. 6A, the ALU 62 waits for an input from the receiver 61 (step ⓑ of FIG. 6A). When an input is supplied to the ALU 62, the ALU 62 performs the following processing on the basis of input data shown in FIG. 4. That is, the received flag is first checked (steps ⓒ and ⓓ of FIG. 6A). When the flag indicates that coordinate information has been received, it is judged in step ⓕ of FIG. 6B whether the pen 1 is put in the pen up status or put in the pen down status. When the pen 1 is put in the pen up status, a cursor is placed at an input point having x- and y-coordinates (step ⓙ of FIG. 6B). Then, it is judged in step ⓖ of FIG. 6B whether a stroke is being inputted or not. This is done by the status flag which indicates whether or not the previous input mode is a stroke-input. In the case where the status flag does not indicate a stroke-input, the ALU 62 waits for the next coordinate information (step ⓑ of FIG. 6A).

Otherwise, the status flag is initialized, and the number m of position coordinates (each including x- and y-coordinates) included in the stroke is written in the FIFO memory 64 by using the input pointer 68. Then, the input pointer 68 is advanced by one, and the value of m is initialized (step ⓗ of FIG. 6B).

Figure 6B:
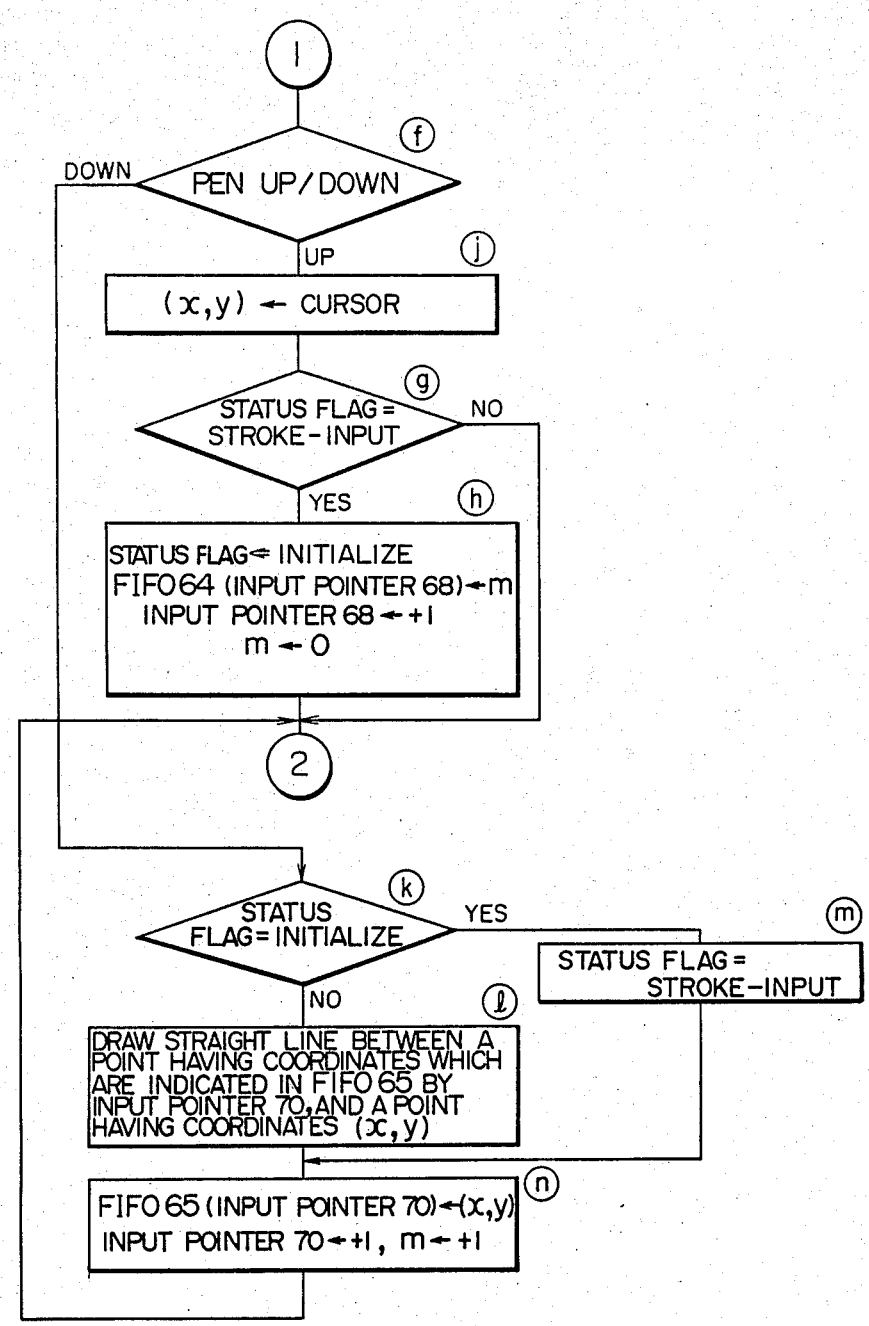

When it is indicated in step ⓕ of FIG. 6B that the pen 1 is put in the pen down status, it is judged in step ⓚ of FIG. 6B whether the status flag is "initialized" or not. In the case where the status flag is "initialized", the status flag is changed to the stroke input mode, to indicate that the inputting of a stroke is started (step ⓜ of FIG. 6B). During a period when the stroke is inputted, a straight line connecting a point having coordinates which have been stored at the last position of the FIFO memory 65, and a point having coordinates (x, y) which are newly supplied to the FIFO memory 65, is delivered from the ALU 62 (step ⓛ of FIG. 6B). Further, independently of the mode, the newly-supplied coordinates (x, y) are written in the FIFO memory 65, and the input pointer 70 and the value m indicating the number of position coordinates making up the stroke are both updated (step ⓝ of FIG. 6B).

By carrying out the above processing, the number of position coordinates included in each stroke is stored in the FIFO memory 64, and a number of pairs of x- and y-coordinates are stored in the FIFO memory 65.

In the case where the flag is one of the FLAG B or FLAG C, the following processing is performed to erase n strokes which have been used for recognition.

At first, the number p of position coordinates included in the first stroke is read out from the FIFO memory 64, and the output pointer 67 is updated (step ⓞ of FIG. 6A). Further, first coordinates ($\alpha$, $\beta$) are read out from the FIFO memory 65, the output pointer 69 is advanced by one, and the value of p is reduced by one (step ⓟ of FIG. 6A). Further, the next coordinates ($\gamma$, $\delta$) are read out from the FIFO memory 65 in the same manner as above (step ⓡ of FIG. 4A). Then, the ALU 62 erases a straight line connecting a point having the coordinates ($\alpha$, $\beta$) and a point having the coordinates ($\gamma$, $\delta$). Thereafter, the coordinates ($\gamma$, $\delta$) are substituted for the coordinates ($\alpha$, $\beta$), to prepare for the erasure of the next straight line (step ⓢ of FIG. 6A). Such an operation is repeated till the value of p becomes equal to zero, (step ⓤ of FIG. 6A).

When the erasure of one stroke is completed, the value of n is reduced by one (step ⓥ of FIG. 6A). The erasure of strokes is repeated until all of the strokes having been used for recognition are erased (step ⓧ of FIG. 6A). Thus, only strokes, for which recognition processing is completed, are successively erased.

The output circuit 63 controls the delivery and erasure of a stroke in the above flow. A stroke can be written in and erased from the frame memory 5 by performing a write operation for the frame memory 5 through an exclusive-OR operation.

When two inputs are expressed by a and b and an output is expressed by c, the exclusive OR of the inputs a and b is given by the following truth table:

| a | b | c |
|---|---|---|
| 0 | 0 | 0 |
| 0 | 1 | 1 |
| 1 | 0 | 1 |
| 1 | 1 | 0 |

Accordingly, the following equation is obtained:

$$(a \oplus b) \oplus b = a$$

where $\oplus$ indicates the exclusive OR operation.

That is, when the exclusive-OR operation using the input b is twice performed for the input a, the result is equal to a.

Accordingly, in order to write a point in the frame memory 5 at a position F(x, y), the exclusive-OR is taken between F(x, y) and 1. Then, the following equations are obtained:

$$F(x, y) \oplus 1 = 1 \text{ if } F(x, y) = 0$$
$$= 0 \text{ if } F(x, y) = 1$$

In order to erase the point, the numeral 1 is again written at the same position through the exclusive-OR operation. Then, the following equations are obtained:

$$F(x, y) \oplus 1 = 0 \text{ if } F(x, y) = 1$$
$$= 1 \text{ if } F(x, y) = 0$$

As is apparent from the above, the value of F(x, y) is returned to an original value, and thus the point can be erased.

(4) Operation of display control means 6

The display control means 6 has received the reference coordinates ($X_0$, $Y_0$) and information as to which of the ordinary display and the ½ display is used, through the bus 109. Accordingly, the display control means 6 can send a read address to the frame memory 5 through a bus 106. On receiving data from the frame memory 5 through the bus 105, the display control means 6 sends an address 108 and data 107 to the liquid crystal display 2. Thus, the contents of the frame memory 5 can be sent to the display 2.

As has been explained in the foregoing, according to the present embodiment, strokes corresponding to the result of recognition are erased from the display screen, before the result of recognition is displayed. Further, since input means and output means are united in one body, stroke information which is not yet subjected to recognition processing, and the result of recognition processing for the above stroke information can be time-sequentially displayed at the same input place. Thus, the man-machine relation is improved.

Other embodiments of an apparatus for recognizing and displaying handwritten characters and figures according to the present invention. For example, the recognition means and processing means may be included in a single processor, or rather than sending out the number of strokes which have been used for recognition, the number of position coordinates included in the above strokes may be sent out from the recognition means. In the former case, since a single processor can perform both the operation of the recognition means and the operation of the processing means, it is not required to transfer the number of strokes which have been used for recognition, but the processor can perform a control operation for directly erasing displayed strokes. At this time, it is required to erase only strokes having contributed to recognition while retaining strokes which have not yet contributed to recognition in the display.

As has been explained in the foregoing, according to the present invention, input strokes are successively displayed on a display device, and strokes which have been used for recognizing a character or figure are erased from the display device to display the character or figure in place of the strokes. Thus, an apparatus for recognizing and displaying handwritten characters and figures according to the present invention has a satisfactory man-machine relation.

We claim:

1. An apparatus for recognizing and displaying handwritten characters and figures comprising input means for reading input stroke information as to a character and a figure each inputted by handwriting, recognition means for carrying out character/figure recognition on the basis of features of the input stroke information, display means including a display screen for displaying the input stroke information and the result of recognition, and processor means responsive to information received from said recognition means for controlling said display means so that said input stroke information is initially displayed on said display screen, and thereafter the result of recognition of the input stroke information as indicated by said recognition means is displayed and the input stroke information which has been used for that recognition is erased from said display screen, while input stroke information which has not contributed to said recognition is retained on said display screen.

2. An apparatus for recognizing and displaying handwritten characters and figures according to claim 1, wherein said processor means controls said display means to display the result of recognition after the input stroke information which has been used for the recognition is erased from said display screen.

3. An apparatus for recognizing and displaying handwritten characters and figures according to claim 1, wherein said recognition means sends information corresponding to the input stroke information which has been used for recognition to said processor means when the result of recognition is sent from said recognition means to said processor means, and said processor means is responsive to said information corresponding to the stroke information for identifying that part of the input stroke information which is to be erased from said display screen.

4. An apparatus for recognizing and displaying handwritten characters and figures according to claim 3, wherein said information corresponding to stroke information sent from said recognition means to said processor means includes a count of the number of strokes used for the recognition.

5. An apparatus for recognizing and displaying handwritten characters and figures according to claim 3, wherein said information corresponding to stroke information sent from said recognition means to said processor means includes a count of the number of position coordinates included in strokes used for the recognition.

6. An apparatus for recognizing and displaying handwritten characters and figures according to claim 1, wherein the input stroke information is displayed on said display means in the order read by said input means, and each time the result of recognition is sent from said recognition means to said processor means, that part of said input stroke information displayed by said display means which corresponds to said result of recognition is erased.

7. An apparatus for recognizing and displaying handwritten characters and figures according to claim 3, wherein said information corresponding to stroke information sent from said recognition means to said processor means includes a count of the number of strokes having been used for recognition and the number of position coordinates included in said strokes.

8. An apparatus for recognizing and displaying handwritten characters and figures according to claim 1, wherein said input means and said display means are disposed in overlapping relationship to each other to form a united body, and processing means controls said display means to display the input stroke information at the same place as inputted by handwriting.

9. An apparatus for recognizing and displaying handwritten characters and figures according to claim 1, wherein said recognition means carries out character/figure recognition each time stroke information is inputted and wherein each time character/figure recognition is completed, the input stroke information which has been used for recognition is erased from said display screen, and then the result of recognition is displayed on said display screen.

10. A display method in an apparatus for recognizing and displaying handwritten characters and figures, said apparatus including input means for reading input stroke information as to a character and a figure each inputted by handwriting, recognition means for carrying out character/figure recognition on the basis of the feature of the input stroke information, and display means having a display screen for displaying the input stroke information and the result of recognition, said display method comprising the steps of:
 performing recognition processing in said recognition means each time said recognition means receives input stroke information from said input means so as to recognize a character or a figure;
 displaying on the display screen of said display means the input stroke information received by said recognition means;
 storing information as to the number of strokes which have been used for the recognition processing; and
 erasing only the stroke information which has been used in said recognition processing to achieve recognition of a character or figure from the display screen of said display means on the basis of said stored information when said recognition means has recognized a character or figure, and displaying the character or figure which is the result of recognition as well as stroke information which is being used for the next recognition processing on said display screen.

11. A display method according to claim 10, wherein said step of storing information includes storing the number of position coordinates included in said strokes.

12. A display method according to claim 10, wherein said step of storing information as to the number of strokes which have been used for the recognition processing is effected by storing the number of position coordinates included in said strokes.

* * * * *